United States Patent [19]
Pollet et al.

[11] Patent Number: 5,009,941
[45] Date of Patent: Apr. 23, 1991

[54] TUBE OR PIPE FORMED A THERMOPLASTIC POWDER IMPREGNATED FIBERGLASS ROVING

[75] Inventors: Jean-Claude Pollet, Granville; Gary L. Williams; Gordon P. Armstrong, both of Newark; David G. Miller, Pataskala, all of Ohio

[73] Assignee: Owens-Corning Fiberglas Corporation, Toledo, Ohio

[21] Appl. No.: 269,029

[22] Filed: Nov. 9, 1988

Related U.S. Application Data

[63] Continuation of Ser. No. 24,949, Mar. 12, 1987, abandoned.

[51] Int. Cl.$^5$ .................... B32B 1/08; B29D 22/00
[52] U.S. Cl. .................... 428/36.3; 65/3.43; 138/129; 138/DIG. 2; 156/167; 156/173; 156/180; 428/36.9; 428/376; 428/377
[58] Field of Search ............ 65/3.41, 3.43, 3.44; 138/129, DIG. 2; 427/389.8; 428/36.3, 36.9, 34.1, 377, 376; 524/500; 525/101; 156/167, 172, 173, 180

[56] References Cited

U.S. PATENT DOCUMENTS

| | | | |
|---|---|---|---|
| 2,656,873 | 10/1953 | Stephens | 65/3.43 X |
| 3,126,297 | 3/1964 | Diamantopoulos et al. | 427/389.8 X |
| 3,450,658 | 6/1969 | Morrison | 427/389.8 X |
| 3,742,106 | 6/1973 | Price | 156/167 X |
| 3,862,287 | 1/1975 | Davis | 427/375 X |
| 4,039,716 | 8/1977 | Johnson | 65/3.41 X |
| 4,225,650 | 9/1980 | Van Brederode et al. | 525/387 X |
| 4,426,469 | 1/1984 | Marzola et al. | 524/586 X |
| 4,477,610 | 10/1984 | Ishimura et al. | 523/414 |

*Primary Examiner*—Lorraine T. Kendell
*Attorney, Agent, or Firm*—Patrick P. Pacella; Catherine B. Martineau

[57] ABSTRACT

A thermoplastic impregnated fiberglass pipe or tube and the process for making such pipe are disclosed. The pipe or tube is made of thermoplastic impregnated fibrous roving which consists of a plurality of glass filaments, at least a portion of the filaments' surfaces being in contact with the residue produced by evaporating water from an aqueous size composition consisting of an organosilane coupling agent, a polyethylene oxide binder material, and a polypropylene thermoplastic polymer resin, wherein the composition is applied to the glass fiber during the fiber forming process. The pipe forming process includes filament winding the rovings around a spindle and thereafter heating the wound rovings to fuse the thermoplastic polymer resin.

4 Claims, No Drawings

TUBE OR PIPE FORMED A THERMOPLASTIC POWDER IMPREGNATED FIBERGLASS ROVING

This is a continuation of application Ser. No. 024,949, filed Mar. 12, 1987, now abandoned.

TECHNICAL FIELD

This invention relates to a process for producing a tube or pipe from a thermoplastic powder impregnated fiberglass roving, and the pipe produced thereby. The fiberglass roving is a highly loaded, impregnated fibrous strand where the impregnation takes place during the fiber forming operation. In one of its more specific aspects, this invention relates to a process for producing a filament wound tube or pipe using polyethylene powder impregnated glass fiber strands and to the pipe produced thereby.

BACKGROUND OF THE INVENTION

The production and use of thermoplastic and polyester pipes is well-known. However, these pipes often have limited uses and cannot be used in the chemical processing industry where the pipe would be subjected to heat distorting temperatures, exposed to reactive materials, or used in reactive environments.

There has now been invented a tube or pipe made from thermoplastic impregnated fibrous strands which pipe has performance advantages over prior art plastic pipes. The glass or fiber thermoplastic reinforced pipe is especially useful in the chemical processing industry or as electrical conduit. The glass or fiber thermoplastic reinforced pipe has improved strength as a result of the glass fiber reinforcement. In addition, the fiber reinforced thermoplastic pipe is corrosion resistant.

SUMMARY OF THE INVENTION

According to the present invention, there is provided a process for producing a tube or pipe formed from a thermoplastic powder impregnated fiberglass roving, which roving includes a fibrous strand impregnated with a slurry composition containing a thermoplastic resin, a coupling agent such as a silane, a binder or film former material and a thickening agent. A rheology modifier may also be added to the slurry. The slurry composition is applied to the glass fiber during the fiber forming operation. The resulting sized thermoplastic impregnated glass fiber rovings are fabricated into glass fiber reinforced tubes or pipes by preheating the rovings, winding the rovings around a mandrel or spindle at a predetermined wrap angle and, heating the wrapped mandrel.

Also, according to this invention there is provided a tube or pipe formed from a glass fiber impregnated with a thermoplastic composition. The thermoplastic impregnated glass fiber tube has excellent mechanical properties relative to commercially available thermoplastic tubes or pipes.

These and other aspects and advantages of the present invention will become clear after consideration is given to the detailed description of the invention which follows.

DETAILED DESCRIPTION OF THE INVENTION

The present invention relates to a process for producing a tube or pipe formed from a yarn or strand (bundle of filaments), which filaments are preimpregnated with a thermoplastic polymer during the filament forming operation, and the tube or pipe produced therefrom.

The present invention uses any glass fiber conventionally utilized for the reinforcement of polymeric resins. The term "glass fibers" as used herein shall mean filaments formed by attenuation of one or more streams of molten glass and to strands formed when such glass fiber filaments are gathered together in the forming process. The term shall also mean yarns and cords formed by applying and/or twisting a multiplicity of strands together and to woven and nonwoven fabrics which are formed of such glass fiber strands, yarns, or cords. Preferably, the size formulation of the present invention is useable with E-type fibers having a diameter in the range of from about 0.35 to about 0.90 mil.

The individual components utilized in the practice of this invention are commercially available and can thus be blended with one another in the preparation of the formulation embodying the features of the present invention.

Generally, the fiber is reinforced with a carrier solvent, normally water, a coupling agent, a binder or film former material, a thickener or rheology modifier material, and a matrix thermoplastic resin powder dispersed in the sizing to form a slurry.

Any suitable coupling agent can be employed in the successful practice of this invention. The coupling agent acts to produce adhesion between the matrix resin and provide strength development and retention of the matrix resin in the slurry. One example of a suitable coupling agent is a silane. Preferrably, the silane is an organosilane including, for example, gammaaminopropyltriethoxysilane (commercially available from Union Carbide under the trade name "A-1100"). The coupling agent will normally be contained in an amount within the range of from about 0.05 to about 5 percent, by weight, of the slurry mixture.

Any suitable binder material can be employed. The binder or film former material aids in the handling and processing of the filament during the fiber forming process. Suitable binder or film former materials are, for example, epoxy, polyester, polyvinyl acetate, polyvinyl alcohol, acrylics, or other chemicals which have the ability to bond the thermoplastic powder particles to the fiber upon the evaporation of the water or which have the ability themselves to suspend the particles in the slurry and subsequently bond themselves to the fiber. The binder material will normally be contained in an amount within the range of from about 0.5 to about 5 percent, by weight, of the slurry mixture.

Any suitable thickener material can be employed. The thickener material acts as a rheology modifier so that the thermoplastic powder particles will actually adhere to the fiber. Without the thickener material the thermoplastic powder particles may stay behind on the rolls of the applicator while the carrier solvent goes on the fiber. The result would be a rapid build-up of powder on the applicator rolls, which in turn, rapidly causes fiber breakage.

Any suitable resin can be employed. The thermoplastic resins are dispersed into the sizing in the form of fine particles. In a preferred embodiment the size of the powder particles are between about 5 to 50 microns, or more preferrably between about 10-30 microns. The resin powders can be applied to the filaments in an amount within the range of of between about 5 about 50 percent, by weight, of the final pregpreg yarn or strand. In preferred embodiments, the amount of powders applied to the filaments are between about 20 to 35 wt. percent or about 20 to 50 wt. percent. One particularly suitable resin is polypropylene.

The sizing composition suspends the thermoplastic powder particles in the slurry. The slurry compositions are best produced by blending all materials in their liquid state with agitation. A uniform coating of the composition can be applied to the glass fibers in any suitable manner during the fiber forming process. Preferably, the compositions of the present invention are applied to the surface of the glass fiber in the manner described in the co-pending U.S. application Ser. No. 07/269,089 filed Nov. 9, 1988 which is a continuation of Ser. No. 07/024,953 filed Mar. 12, 1987, now abandoned (the entire disclosure thereof being expressly incorporated herein to by reference). The resultant slurry composition is sufficiently liquid to be applied to the fibers during the fiber-forming operation. Each fiber is coated by the slurry mixture as the fibers are formed, that is, at or about the place in their formation where the conventional size compositions are typically applied (e.g., between the bushing and the spindle on which the fibers are wound as a package). In one fiber forming process, the continuous fibers leave the bushing and are dipped into the slurry and are impregnated with the slurry. The highly loaded thermoplastic strands or rovings are subsequently dried in order to evaporate or remove the water. The impregnated rovings are then cured in order to set the binder or film former material. The curing or setting "glues" the powder particles along the surface of the fibers. The resultant impregnated rovings can be subsequently heated to allow the melted thermoplastic polymers to fuse.

The resultant continuous thermoplastic impregnated rovings are then filament wound to produce a thermoplastic fiberglass pipe. The roving is wound around a mandrel or similar type spindle and subjected to a heat treating step in order to fuse the thermoplastic material. The angle at which the roving is wrapped around the mandrel may be changed depending upon the work loads to be put upon the pipe. In a preferred embodiment the optimum wrap angle of the roving is oriented at about 60 degrees.

While the above describes the present invention with sufficient particularity, the following is intended to further exemplify the present invention. The following thermoplastic slurry was applied to glass fibers during the forming operation to achieve a thermoplastic content of 23% relative to the total weight of the prepreg roving. The roving is then formed into tubes or piping.

| Composition and Range | |
|---|---|
| Polyethylene powder | 30 to 50% |
| Polyethylene oxide | .5 to 5% |
| Coupling Agent | .05 to 5% |

-continued

| Composition and Range | |
|---|---|
| Water | balance to 100% |

The thermoplastic powder has preferably an average particle size between 5 and 40 microns and no particle retained by an 80-mesh screen (more preferably 115 mesh, most preferably 200 mesh). Other polyethylene oxides of different molecular weight, molecular weight distribution or branching may also be suitable, such as any of the Polyox series having a molecular weight between 100,000 and 4,000,000. Once the slurry was mixed together, continuous glass fibers were coated with the slurry mixture. The impregnated glass fibers were then collected into a roving, wound around a take-up bobbin, and dried so as to evaporate the water from the impregnated roving. The roving was then cured or set so as to allow the binder material to "glue" the thermoplastic powder particles along the surfaces of the glass fibers.

The roving was pulled under high tension past commerical infrared heating sources having a peak absorption wave of 2.7–3.0 for glass and 3.4 to 3.5 for polyethylene. The rovings are heated to a temperature of 300°–350° F. such that the polyethylene powder melts to a high viscosity fluid. At this time the rovings are wrapped on a 1⅛" mandrel rotating at about 8 SF/M which has been preheated to approximately 335° F. After a number of wraps at a predetermined wrap angle the mandrel is cooled with the polyethlene/fiberglass wrapped roving. The mandrel is then extracted yielding a tube or pipe.

It will be evident from the foregoing that various modifications can be made to this invention. Such, however, are considered as being within the scope of the invention.

We claim:

1. A pipe or tube formed from a yarn or strand consisting essentially of a plurality of glass filaments, at least a portion of the filaments' surfaces coated with a coating formed from the residue produced by evaporating water from an aqueous composition for the glass filaments comprising, in weight percent, an organosilane coupling agent in the range of about 0.05 to about 5.0%, by weight, a polyethylene oxide binder or film former material in the range of about 0.5 to about 5.0%, by weight, and a polypropylene thermoplastic polymer resin powder in the range of about 30–50%, by weight, and having an average particle size between about 5 to about 50 microns, the balance being water.

2. The pipe of claim 1, in which the organosilane is gamma-aminopropyltriethoxysilane.

3. The pipe of claim 1 were in the thermoplastic polymer resin is present in average particle size between about 10 to about 30 microns.

4. The pipe of claim 1 in which the composition consists of, in weight percent of the following: polyethylene oxide—1.2 wt. percent; gamma aminopropyltriethoxysilane—0.2 wt. percent; and water—about 58–60 wt. percent.

* * * * *